Sept. 15, 1959    H. ERNST ET AL    2,903,922
SELF-CENTERING DRILL

Filed Feb. 20, 1956    2 Sheets-Sheet 1

INVENTORS.
HANS ERNST.
BY WILLIAM A. HAGGERTY.
N.H. Parsons + L.W. Wright.
ATTORNEYS.

United States Patent Office 2,903,922
Patented Sept. 15, 1959

2,903,922

SELF-CENTERING DRILL

Hans Ernst and William A. Haggerty, Cincinnati, Ohio, assignors to The Cincinnati Milling Machine Co., Cincinnati, Ohio, a corporation of Ohio Application February 20, 1956, Serial No. 566,504

13 Claims. (Cl. 77—70)

This invention relates to rotary cutting tools and more particularly to a new and improved form of drill.

It is well known in the art that conventional drills, such as the common two-lipped twist drill, have a spiral fluted body which terminates in a conical end having straight cutting lips which lie in non-radial planes which are approximately parallel to a diametrical plane through the axis of the drill and are displaced equal distances on opposite sides of said diametrical plane. Therefore, the inner ends of these lips do not intersect at the center of the drill because they lie in non-radial planes. In conventional drills these inner ends of the lips are connected by a so-called chisel edge which passes through the axis of the drill and perpendicular thereto. Upon rotation of the drill, this chisel edge, which is comparatively short, is rotated in a plane perpendicular to the axis of the drill and about a midpoint in the length of its edge. The advancing face of this edge has a large negative rake angle of about 60 degrees, and it is well known that such an angle is not conducive to cutting, and the best the edge can do is to wedge itself into the material and effect its removal by an extruding process. Due to these facts, the chisel edge does practically no cutting as such, and during rotation has the undesirable effect of a flat surface on the end of the drill. This makes it difficult to start the drill cutting in a flat work surface at the exact center of a proposed hole because the drill has a tendency to walk around on this flat surface before forming and settling down into a depression to continue the work of forming a hole. That is why it is common practice to utilize jigs and fixtures, which are expensive, in order to insure that the drill is properly guided and held in the proper position to form the hole exactly on its intended axis.

One of the objects of this invention is to provide a self-centering drill which will have the property of automatically forming a self-centering depression in the work at the first point of contact therewith.

It is common practice in the art of drilling to center punch work at the point where a hole is to be drilled and presumably exactly on the axis thereof when no jig or fixture is available, and the larger the drill the deeper the center punching should be to provide a suitable pilot depression to restrain the drill from walking around, and even then there is no assurance that such undesirable action will not occur because the chisel edge is still approximately flat or parallel to the work surface.

Another object of this invention is therefore to provide a drill having a new and improved formation on the tip which is sharply arched or pointed in an axial plane to produce a cutting edge which will more easily fit into any depression in the work as it contacts the same and thus automatically center or locate itself immediately.

A further object of this invention is to provide a drill with a new and improved conformation on the end thereof which not only has a self-centering action but also an effective cutting action practically in to the center of the drill.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
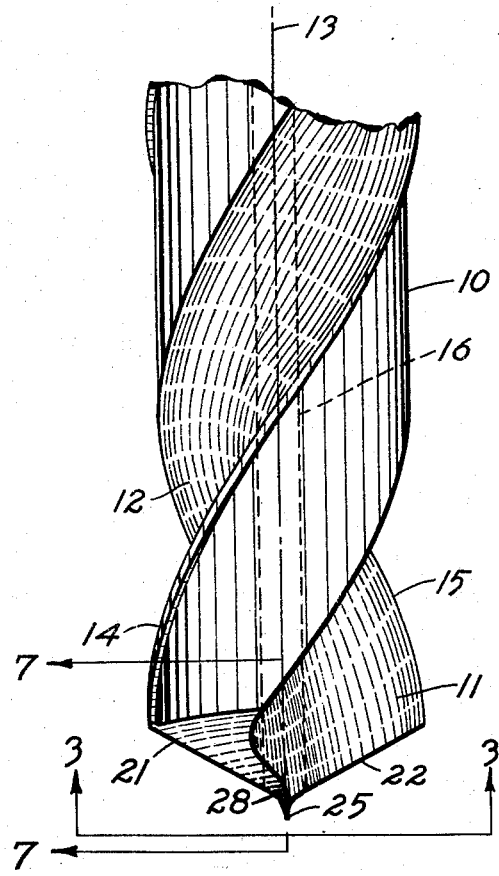
Figure 1 is a vertical elevation of a drill embodying the principles of this invention.
Figure 2:
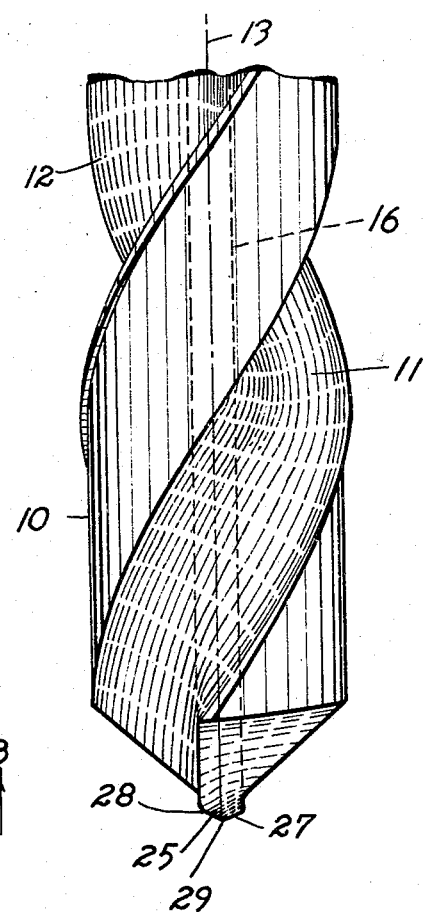
Figure 2 is an elevational view of the drill shown in Figure 1 and viewed from the right hand side thereof.
Figure 3:
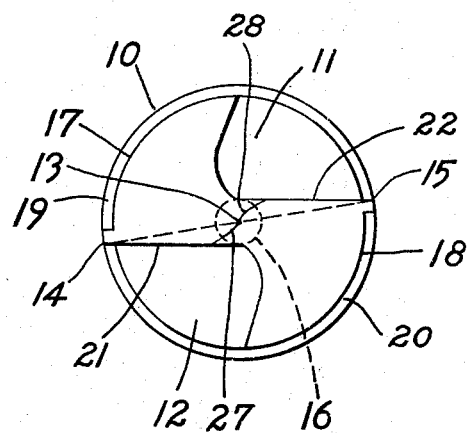
Figure 3 is an end view of the drill shown in Figure 1 as viewed on the line 3—3 of that figure.

Referring to the drawings and more particularly to Figures 1 and 2, the reference numeral 10 indicates, in general, a drill embodying the principles of this invention. A very good example of a drill to which the principles of this invention is applicable is the well-known two-lipped twist drill, and the reference numeral 10 in Figures 1 and 2 indicates such a drill, the body of which has spiral flutes 11 and 12 formed therein on opposite sides of the axis of rotation 13 as shown in Figure 3 and extending longitudinally of the drill body.

Although a two-lipped twist drill has been utilized as a good example for the application of the principles of this invention, it will be understood that there are many other forms of drills with various numbers of flutes, and some which are not even fluted or necessarily have conical ends. All drills, however, do have some form of cutting lips on the end thereof and this invention is therefore applicable to all drills.

The flutes or grooves on twist drills form the customary peripheral cutting edges 14 and 15 extending spirally along the periphery of the drill. The material at the center of the drill which separates the flutes at their closest points is known as the web, and may be considered as a straight or tapering cylindrical column 16 extending through the center of the drill as shown in Figures 1 and 2, and the end of this column is represented as the dotted circle 16 in Figure 3.

The spiral flutes 11 and 12 are cut or formed in the body of the drill to a depth which determines the size or diameter of the web column, and they divide the periphery of the drill into lands 17 and 18 which begin at the cutting edges 14 and 15 respectively, and extend around the periphery of the drill to the next flute, it being customary to relieve the lands as shown at 19 and 20 to provide clearance for the drill and reduce rubbing friction with the sides of the hole being formed upon rotation of the drill.

The lands terminate at the end or point of the drill in the main cutting edges or lips 21 and 22. The entire end of the drill is considered the point of the drill and is usually considered as conical in form as shown in the drawings, so that the cutting lips lie in this conical end surface.

Figure 5:
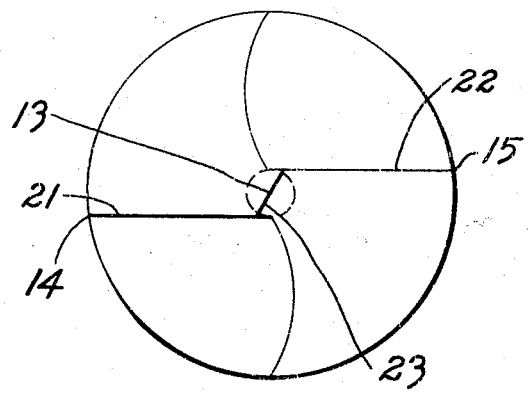
Figure 5 is an end view of a conventional twist drill.

In conventional drills, as distinguished from this invention, the cutting lips 21 and 22, as shown in Figure 5, terminate in a chisel edge 23 which extends diametrically across the end of the drill substantially perpendicular to the axis 13 thereof and connects the inner end of one lip with the inner end of the other. The chisel edge 23 really forms the end or terminus of the web column, and if the web column is considered a circle, the length of the chisel edge may be considered as approximately equal to the diameter of that circle. It will now be appreciated that the end of the conventional drill is nearly flat or straight and does not lend itself to entering a small conical center hole or depression in the work and that there is nothing about the drill that causes it to self-center itself exactly on the axis of a hole to be drilled.

Herein the end of the web column will be designated as the tip of the drill, and it will now be apparent that in standard or conventional drills the formation or configuration of the tip is a chisel edge but in this invention the shape or formation is entirely different to give the drill among other things a self-centering property.

It is well known that in any drills having cutting edges or lips on the end thereof, the effective cutting lengths of the opposite lips must be equal to make the drill symmetrical and to balance the forces on the drill so that it will form a straight hole. Any unbalance of these forces causes the drill to creep sideways or wobble, and distort the shape of the hole. In fluted drills, the cutting lips cannot extend to the center or axis of the drill because there would be no material left to form the core or web to support the drill.

It thus follows that, except in rare cases, drills have main cutting edges on the end thereof which, although non-radial, approach the center of the drill, and then a short auxiliary edge, such as the chisel edge, at the center of the drill to interconnect the inner ends of the main cutting edges and to displace the metal ahead of the column web.

The improved tip of this invention is in the nature of an auxiliary connecting edge means extending crosswise of said lips through the center of the drill for interconnecting the inner ends of the cutting lips and is so contrived as to arch the end of the drill to an appreciable point on the end of its axis for work centering and penetration purposes; and to shape the surfaces on each side of the edge means to provide for efficient cutting action. This edge means is indicated generally by the reference numeral 25 in the drawings.

Figure 7:
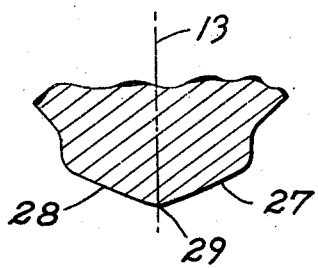
Figure 7 is an enlarged detail section as viewed on the line 7—7 of Figure 1.

The edge 25 appears in profile in Figures 2 and 7 of the drawings, and is made up of two lines or two arcs 27 and 28 about different centers, which gives it the form of an obtusely pointed arch with the two lines or arcs 27 and 28 meeting at a point 29 on the axis 13 of the drill. This provides a small centering point which is adapted to enter the material first and thus provide an initial centering means for the drill.

Figure 4:
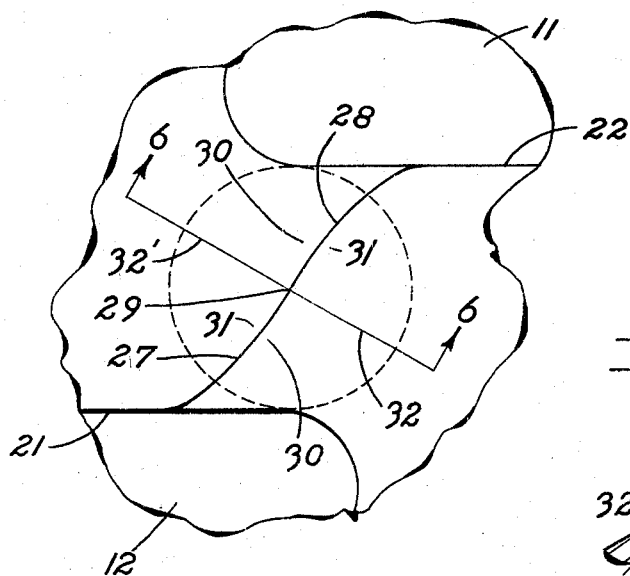
Figure 4 is an enlarged view of the center portion of Figure 3.

In case the surface of the work has been center punched to locate the exact position of the hole to be drilled so much the better because there will be more of the edge, than simply the point in initial engagement with the material and thus a stronger centering action will be obtained. In plan view, the edge is not straight but somewhat S-shaped as shown in Figure 4 with the center 29 of the S lying in the axis of the drill. Since this center point 29 is the point where the direction of curvature of the S changes, it may be designated as a nodal point of the edge.

It will be noted that each part 27 and 28 making up the S curve has a convex side or face 30 and a concave side or face 31 which extend to the axis of the web. The arrangement is such that the convex side faces in the direction of rotation of the drill and therefore is the cutting face. These small cutting faces have the same direction of movement as the cutting faces on the lips 21 and 22 of the drill. The cutting faces 30 are characterized by their rake angle as hereinafter described, while the rear face or flanks 31 are characterized by their clearance angle. Since the rake angle of one cutting face 30 on one side of the S edge must merge into the complement of the clearance angle for the flank face 31 on the same side of the S edge, it is obvious that in order for the drill to be symmetrical, the angle that the merger line 32 makes with the axis of the drill must be equal on each side of the S curve so that the total angle in a diametrical plane through the nodal point 29 between the merger lines 32 and 32' is an acute angle, and the sides of this angle are elements lying in the faces on opposite sides of the S-edge.

Figure 6:
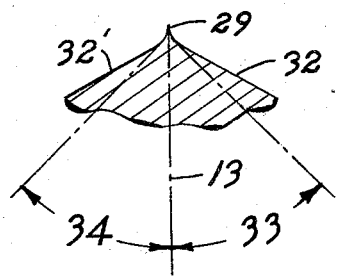
Figure 6 is a detail section on the line 6—6 of Figure 4.

Thus, as successive points are taken along the S edge outward from the center of the drill, one-half of this acute angle, such as 33, Figure 6, decreases to form the rake angle for the cutting face portion 30 and the other half 34 of the angle increases to form the angle for the flank face or portion 31, which therefore provides increased strength to back up the cutting face. The rake angle of the cutting face may be measured or determined in two different ways. One is to measure it in planes perpendicular to tangents to the curve 25, and the other way is to measure it in planes parallel to the axis and extending in the direction of cutting and therefore always perpendicular to a radius from the axis of rotation. Whichever is used, the fact remains that the rake angle of the cutting face measured at its apex in the S curve reduces sharply as successive points are taken from the center outward. This angle is measured at the apex because the cutting face has a slightly concave curvature which eventually blends into the general conical surface on the end of the drill. This rake angle therefore becomes much less negative as successive points are chosen along the S edge further from the center. This decreasing angle acts to move the chips toward the periphery of the drill and also increases the efficiency of the cutting action of the auxiliary cutting edge 25. The ends of the S-shaped curve are approximately blended into the ends of the cutting lips so as to form substantially continuous cutting edges from the center of the drill to the periphery, forming a spiroidal surface.

The size of the rake angle at the center is slightly less than the rake angle of the conventional chisel edge, which is approximately equal to the conventional point angle of 118 degrees on standard drills, but in this invention the rake angle of the cutting face decreases rapidly at successive points on out to the end of the S edge so that at the end the rake angle approaches about zero degrees. Since the rake angle of the chisel edge remains practically the same all the way, it will be apparent that there is a very marked difference between the rake angle produced by this invention over the angle on conventional drills which is the reason why the S edge is a very efficient cutting edge, while the rake angle on the chisel edge is so negative that it is not even classified as a cutting edge.

This peculiar shape of the cutting face with its decreasing rake angle can be generated and therefore can be classified as a generated surface. It will be noted that the merger line 32 is made up of a straight line and with a little curved radius on the end of it and that it lies in a radial plane of the drill with said radius intersecting the axis of the drill at the same point that the edge intersects the axis of the drill. The radius, of course, can be quite small and, in fact, the smaller the diameter of the drill, the smaller the radius has to be made.

The shape of the merger line 32, as shown in Figure 6, is the shape of the generatrix for producing the generated surface of the cutting face 30. The surface is generated by moving the generatrix in a spiral path. For instance, the point 29 on the generatrix line 32 is moved radially or transversely away from the axis 13 and simultaneously parallel to the axis 13, while, at the same time, moving circumferentially about the drill axis so that the resultant compound movement is a spiral path.

If the plane of the generatrix line 32 is simultaneously maintained radially of the drill axis during this movement of the point 29, it will be seen that a spiroidal surface is developed which, for the purposes of the present application, is intended to define a surface generated by combined radial, axial and circumferential movement of a generatrix, and is not intended to include or define a helicoidal surface generated by combined axial and circumferential movement only.

By continuing this spiral movement through an angle of approximately 90 degrees as viewed in Figure 4, it will be seen that a cutting face will be produced which has a decreasing rake angle. It is the decreasing rake angle that makes the S-shaped cutting edge an effective cutting edge.

It will thus be seen that there has been provided an improved drill having a self-centering action due to the new and novel form of the drill tip which provides a sufficient point to immediately enter a flat work surface at the point of contact or penetration thereof and thus immediately locate and hold the drill in that position. In addition, it will be seen that a drill has been provided which has an improved cutting action by virtue of the efficient cutting edge means extending from the periphery of the drill all the way to the center or axis thereof. This reduces the axial force needed on the drill to form the chips, and the convex cutting faces of the S-shaped edges efficiently cause evacuation of the chip material from the center of the hole to the spiral flutes for removal therethrough. Since the included angle between the lip cutting edge and the S-cutting edge is an obtuse angle, the chips formed by the latter edge are efficiently directed to the flutes and thus do not jam up between the solid end of the drill and the work.

What is claimed is:

1. A drill comprising an elongated body member having an axis of rotation about which the periphery of the body is adapted to rotate in a circle concentric with said axis, cutting lips formed on the end of the body and extending inward from the periphery thereof, said cutting lips being of equal length with their inner ends equally spaced on opposite sides of said axis, an S-shaped cutting edge formed on the end of the body about a diametrical plane between the inner ends of said lips and passing transversely through the axis of the drill with the center of the S lying in said axis, the rake angle of said cutting edge measured in planes perpendicular to tangents thereto being of a maximum negative value at the axis of the drill and decreasing rapidly and uniformly at successive points outward from the axis to a substantially smaller negative value at the cutting lips, the profile of said cutting edge in said diametrical plane having the form of an obtusely pointed arch the point of which lies on the axis of the drill whereby the point of said arch will form a centering point on the end of the drill.

2. A drill comprising an elongated body member having an axis of rotation about which the periphery of the body rotates, cutting lips formed on the end of the body extending inwardly from the periphery and terminating in equally spaced relation with respect to said axis, a cutting edge formed centrally on the end of the drill between said inner ends of said lips but located axially beyond them to form a centering tip on the end of the drill, said edge extending crosswise of the lips on the drill and passing through the axis thereof, the rake angle of said cutting edge measured in planes perpendicular to tangents thereto being of a maximum negative value at the axis of the drill and decreasing rapidly and uniformly at successive points outward from the axis to a substantially smaller negative value at the cutting lips, said cutting edge having a lateral profile in the shape of an obtusely pointed arch, the point of which lies in the axis of the drill to form a centering point on the end of the drill.

3. A spiral fluted drill having a generated conical end surface and flutes formed about a cylindrical web, said flutes forming cutting lips in the end surface that lie in secantial planes of said drill which are tangent to the cylindrical web on diametrically opposite sides thereof, the tip of said web projecting beyond said conical surface, an S-shaped cutting edge extending diametrically across the tip and crosswise of said lips, the lateral profile of said edge being in the form of an obtusely pointed arch having its point on the axis of the drill and a width equal to the diameter of said web, one-half of each side face of said edge forming a cutting face and the other half a flank face, the rake angle of the cutting face measured in planes perpendicular to tangents to the cutting edge being a maximum negative value at the axis of the drill and decreasing rapidly and uniformly at successive points along the cutting edge outward from the axis to a substantially smaller negative value at the circumference of said web, said edge merging beyond said web circle into said lips.

4. A spiral fluted drill having a generated conical end surface and flutes formed about a central cylindrical web, the tip of said web projecting beyond said conical surface, an S-shaped cutting edge extending diametrically across said tip and formed by the intersection of two spiroidal surfaces lying on opposite sides of the cutting edge, said spiroidal surfaces each being formed by combined radial, axial and circumferential movement of a generatrix relative to said drill, the lateral profile of said edge being in the form of an obtusely pointed arch having its point on the axis of the drill and a width equal to the diameter of said web, one-half of each side face of said edge forming a cutting face and the other half a flank face, said edge merging beyond said cylindrical web into the lips of the drill formed by said flutes.

5. A spiral flute drill having a general conical end surface and flutes formed about a central cylindrical web, said flutes forming cutting lips in the end surfaces that lie in secantial planes of said drill which are tangent to the circle of the web on diametrically opposite sides thereof, the tip of said web projecting beyond said conical surface, an S-shaped cutting edge extending diametrically across the tip and crosswise of said lips and formed by the intersection of two spiroidal surfaces lying on opposite sides of the cutting edge, said spiroidal surfaces each being formed by combined radial, axial and circumferential movement of a generatrix relative to said drill, the lateral profile of said edge being in the form of an arch having its highest point on the axis of the drill and a width equal to the diameter of said web, one-half of each side face of said edge forming a cutting face and the other half a flank face on opposite sides of the drill axis, the rake angle of the cutting face measured in planes perpendicular to tangents to the cutting edge being a maximum negative value at the axis of the drill and decreasing rapidly and uniformly at successive points along the cutting edge outward from the axis to the circumference of said web, and auxiliary edge means connecting the edge of said S-shaped cutting edge beyond the web circle with said lips to form a continuous cutting edge on the end of the drill.

6. A spiral fluted drill having a general conical end surface and flutes formed about a central cylindrical web, said flutes forming cutting lips in the end surface that lie in secantial planes of said drill which are tangent to the circle of the web and on diametrically opposite sides thereof, the tip of said web projecting beyond said conical surface, a cutting edge extending diametrically across the tip crosswise of said lips and formed by the intersection of two spiroidal surfaces lying on opposite sides of the cutting edge, said spiroidal surfaces each being formed by combined radial, axial and circumferential movement of a generatrix relative to said drill, the lateral profile of said edge being in the form of an arch having its highest point on the axis of the drill and a width equal to the diameter of said web, each side face of said edge being divided at the axis of the drill into a cutting face and a flank face, the intersecting angle of each face with the drill axis being equal, said angle of the cutting face decreasing in rake to substantially zero rake angle at the end of said edge and the angle of the flank face increasing from the axis of the drill to the other end of said edge, a first auxiliary edge means connecting each end of the cutting edge with the cutting lips formed by said flutes and a second auxiliary edge means connecting each end of the cutting edge with the non-cutting lips formed by said flutes.

7. A drill having spiral flutes formed about a central cylindrical web, the longitudinal axis of which is coaxial with the axis of the drill, each flute terminating in a substantially straight cutting lip slanting into substantially tangential relationship with the periphery of said web, said web extending axially beyond the inner ends of said lips to provide a projecting end shaped to form a plurality of cutting edges, one for each lip, which arch toward the axis of the drill into intersecting relationship at the axis to form a centering point on the end of the drill, said arched cutting edges being formed by the intersection of two spiroidal surfaces lying on opposite sides of the cutting edges, said spiroidal surfaces each being formed by combined radial, axial and circumferential movement of a generatrix relative to said drill and blending into the cutting edge of a respective lip to form a substantially continuous cutting edge from the periphery of the drill to said point, and with each successive point outward along said continuous edge from said point being spaced from said point, both axially and radially, successively greater distances.

8. A drill having spiral flutes formed about a central cylindrical web, the longitudinal axis of which is co-axial with the axis of the drill, each flute terminating in a substantially straight cutting lip extending into substantially tangential relationship with the periphery of said web, said web extending axially beyond the inner ends of said lips to provide a projecting end shaped on opposite sides of the drill axis to form faces which converge at an angle to form cutting edges which extend generally from the axis towards the ends of said lips, said faces being each defined by a family of elements which are straight from the periphery of the drill inward to the vicinity of the cutting edge where they terminate in a curve of small radius lying in a plane parallel to the axis of the drill to render the faces slightly concave as they merge to form the cutting edge to produce an acute negative angle on each side of said edge, said angles being equal at the axis of the drill, one face of each radially extending cutting edge constituting a cutting face and the other a flank face, said cutting face having a negative rake angle decreasing at successive points along said edge outward from said axis, and the angle of the flank face increasing outward from said axis, the outer ends of said edges blending into the edge of adjacent lips to form a plurality of substantially continuous cutting edges from the periphery of the drill to its axis.

9. A drill having spiral flutes formed about a central cylindrical web, the longitudinal axis of which is coaxial with the axis of the drill, each flute terminating in a substantially straight cutting lip slanting into substantially tangential relationship with the periphery of said web, said web extending axially beyond the inner ends of said lips to provide a projecting end shaped to provide a crosswise extending S-shaped cutting edge between the ends of the lips and passing through a point on the drill axis which divides the edge into two equal parts, said parts being arched in profile toward and intersecting at said point on said axis to form a centering point on the end of the drill, said parts being formed by the intersection of two spiroidal surfaces lying on opposite sides of the cutting edge, said spiroidal surfaces each being formed by combined radial, axial and circumferential movement of a generatrix relative to said drill and having the outer ends of their edges blended into the edge of adjacent lips to form a plurality of substantially continuous cutting edges from the periphery of the drill to the centering point.

10. A drill comprising an elongated body terminating in a cutting end and having an axis of rotation extending longitudinally thereof, said end having cutting lips formed thereon in secantial planes on opposite sides of said axis, said body having a circular web section centralized on said axis between the lips and substantially tangent thereto, said web extending axially beyond the ends of said lips to provide a projecting end shaped on opposite sides of the drill axis to form faces which converge at an angle to form cutting edges which extend generally from the axis towards the ends of said lips, said faces being each defined by a family of elements which are straight from the periphery of the drill inward to the vicinity of the cutting edge where they terminate in a curve of small radius lying in a plane parallel to the axis of the drill to render the faces slightly concave as they merge to form the edge to produce an acute angle on each side of said edge, said angles being equal at the axis of the drill, one face of each radially extending cutting edge constituting a cutting face and the other a flank face, said cutting face having a negative rake angle decreasing at successive points along said edge outward from said axis and the angle of the flank face increasing outward from said axis, the outer ends of said edges blending into the edge of adjacent lips to form a plurality of substantially continuous cutting edges from the periphery of the drill to its axis.

11. A drill having spiral flutes formed about a central cylindrical web, the longitudinal axis of which is coaxial with the axis of rotation of the drill, each flute terminating in a substantially straight cutting lip extending into substantially tangential relationship with the periphery of said web, said web extending axially beyond the inner ends of said lips to provide a projecting end shaped on opposite sides of the drill axis to form faces which converge at an angle to form an S-shaped cutting edge crosswise of the drill axis, one-half of each face being a cutting face and the other half being a flank face, said faces being each defined by a family of elements which are straight from the periphery of the drill inward to the vicinity of the cutting edge where they terminate in a curve of small radius lying in a plane parallel to the axis of the drill to render the faces slightly concave as they merge to form said angle, the angle of each face at the axis and normal to said edge being equal and of predetermined value, said angle of the cutting faces decreasing and said angle of the flank faces increasing with respect to said value outward along the S-edge, the outer ends of said S-edge blending into the edges of adjacent lips to form a substantially continuous cutting edge across the end of the drill.

12. A drill having spiral flutes formed about a central cylindrical web, the longitudinal axis of which is co-axial with the axis of rotation of the drill, each flute terminating in a cutting lip extending into substantially tangential relationship with the periphery of said web, said web extending axially beyond the inner ends of said lips to provide a projecting end shaped on opposite sides to form faces which converge at an angle to form an S-shaped cutting edge crosswise of the drill axis, each face being defined by a family of elements which are straight from the periphery of the drill inward to the vicinity of the cutting edge where they terminate in a curve of small radius lying in a plane parallel to the axis of the drill to provide a face having a concave surface portion, said portions being on opposite sides of the drill axis and of the S-shaped cutting edge, said surface portions having an acute negative rake angle as measured at its apex in the cutting edge, said surface portions having a spiroidal shape and said rake angle measured in planes perpendicular to tangents to the cutting edge, decreasing rapidly and uniformly at successive points along said edge at successively greater radial distances from said drill axis to a substantially smaller negative value at the cutting lips.

13. A drill having spiral flutes formed about a central cylindrical web, a generated conical surface and centering tip on the end of said drill, said tip being formed on the end of said web and projecting axially beyond said conical surface, a cutting edge extending diametrically across the tip, the lateral profile of said edge being in the form of an arch having its highest point on the axis of the drill and a width approximately equal to the diameter of said web, one half of each side face of said edge forming a cutting face and the other half a flank face, the rake angle of the cutting face measured in planes perpendicular to tangents to the cutting edge being of a maximum negative value at the axis of the drill and decreasing rapidly and uniformly at successive points along the cutting edge outward from the axis to a substantially smaller negative value at the circumference of said web.

References Cited in the file of this patent

UNITED STATES PATENTS

| | | |
|---|---|---|
| 1,467,491 | Oliver | Sept. 11, 1923 |
| 1,809,975 | Kattrein et al. | June 16, 1931 |
| 2,133,414 | Bahuaud | Oct. 18, 1938 |
| 2,600,286 | Weiland | June 10, 1952 |

FOREIGN PATENTS

| | | |
|---|---|---|
| 813,333 | France | Feb. 22, 1937 |

OTHER REFERENCES

"Twist Drill Data for the Designer," The Tool and Die Journal, pp. 86–90, January 1944.